United States Patent
Uchiya et al.

(10) Patent No.: US 6,579,606 B1
(45) Date of Patent: *Jun. 17, 2003

(54) BACK LIGHT REFLECTION SHEET FOR LIQUID CRYSTAL

(75) Inventors: Tomoaki Uchiya, Sagamihara (JP); Koh Shiota, Yokohama (JP); Mitsuhiko Okada, Sagamihara (JP); Hideki Nagamatsu, Sagamihara (JP); Takaaki Nanba, Sagamihara (JP)

(73) Assignee: 3M Innovative Properties Company, Saint Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 93 days.

(21) Appl. No.: 09/029,481

(22) PCT Filed: Aug. 29, 1996

(86) PCT No.: PCT/US96/13784

§ 371 (c)(1), (2), (4) Date: Feb. 24, 1998

(87) PCT Pub. No.: WO97/08252

PCT Pub. Date: Mar. 6, 1997

(30) Foreign Application Priority Data

Aug. 30, 1995 (JP) ............................................. 7-222327

(51) Int. Cl.⁷ ............................. B32B 5/16; B32B 27/00
(52) U.S. Cl. ...................... 428/323; 428/500; 428/220; 428/328
(58) Field of Search ................... 428/500, 480, 428/483, 323, 325, 327, 334, 339, 341, 220, 328–332, 411.1, 515, 923, 926; 349/65, 113

(56) References Cited

U.S. PATENT DOCUMENTS

| | | | | |
|---|---|---|---|---|
| 3,984,176 A | * | 10/1976 | Hirai et al. ............ | 350/160 LC |
| 4,648,690 A | * | 3/1987 | Ohe ........................... | 350/321 |
| 4,775,222 A | * | 10/1988 | Ohe ........................... | 350/321 |
| 5,004,785 A | | 4/1991 | Ida et al. .................... | 525/305 |
| 5,456,967 A | * | 10/1995 | Nezu .......................... | 428/141 |
| 5,746,857 A | * | 5/1998 | Murata et al. ............. | 156/102 |
| 5,753,362 A | * | 5/1998 | Kawase et al. ............. | 428/327 |

FOREIGN PATENT DOCUMENTS

| | | | |
|---|---|---|---|
| EP | 457 009 | 4/1991 | ............ F21V/7/22 |
| JP | 076593 | 3/1992 | |
| JP | 5273552 | 10/1993 | |

* cited by examiner

*Primary Examiner*—Paul Thibodeau
*Assistant Examiner*—Sheeba Ahmed
(74) *Attorney, Agent, or Firm*—Stephen W. Buckingham

(57) ABSTRACT

To provide a reflection sheet, using a thinner, lower stiffness film, for use in surrounding a straight tube type fluorescent lamp in an edge type liquid crystal display panel back light device, which reflection sheet can realize a higher brightness of the back light device. A reflection sheet comprising: a film support having a thickness of 25 to 50 μm and, applied on a surface of the support, a reflective paint coat comprised of a mixture of a resin binder of a (meth)acrylate copolymer with a small particle balloon having a particle diameter of 0.05 to 10 μm and an inside empty diameter to particle diameter ratio of 0.2 to 0.9.

7 Claims, 1 Drawing Sheet

BACK LIGHT REFLECTION SHEET FOR LIQUID CRYSTAL

TECHNICAL FIELD OF INVENTION

Figure 1:
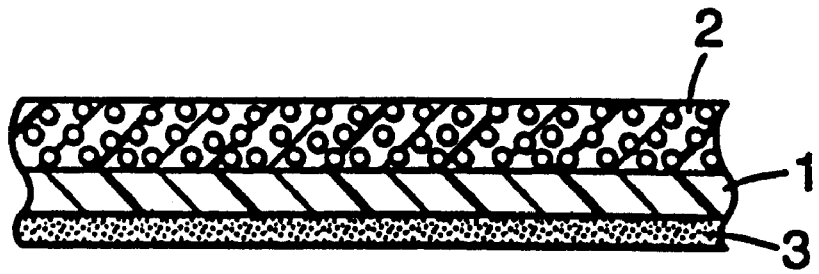

The present invention relates to a reflection sheet, particularly a reflection sheet disposed so as to surround a straight tube type fluorescent lamp provided along the edge of a light guide plate in an edge type back light device among back light devices of liquid crystal display panels, and a reflection sheet disposed on the reverse side of the light guide plate.

PRIOR ART

In an edge type back light device among back light devices of liquid crystal display panels, a straight tube type fluorescent lamp is disposed along the edge of a light guide plate. Part of light emitted from the fluorescent lamp on the light guide plate is directly guided to the light guide plate. The remainder of the light is reflected by a reflection sheet disposed so as to surround the fluorescent lamp and then enters the light guide plate. The light guided to the light guide plate is reflected by a light diffusing layer, which has been printed in a dot form on the reverse side of the light guide plate, and then leaves the surface of the light guide plate (illuminating surface). On the other hand, the light directed to the reverse side of the light guide plate through between the light diffusing layers is reflected by the reflection sheet disposed on the reverse side of the light guide plate. The light diffusing layer is generally formed of a white pigment ink with glass beads optionally dispersed therein.

Many proposals on the light diffusing layer have hitherto been made as means for increasing the brightness of the illuminating surface. Japanese Examined Patent Publication (Kokoku) No. 4-66519 discloses a light diffusing layer having fine cells formed by foaming or a light diffusing layer formed by screen printing of a plastic balloon powder. Japanese Unexamined Patent Publication (Kokai) No. 4-76593 discloses a light diffusing layer formed by screen printing of a balloon polymer, having a diameter of 0.1 to 20 $\mu$m, of an acrylic resin. Japanese Unexamined Patent Publication (Kokai) No. 5-273552 discloses a light diffusing layer formed by screen printing of fine transparent beads or reflective beads including a white pigment. Japanese Unexamined Patent Publication (Kokai) No. 5-303017 discloses a light diffusing layer formed by mixing an acrylic binder with ultrafine particulate titanium oxide coated with an organic fluorescent material to prepare an ink and forming a dot gradation pattern using the ink by screen printing. Japanese Unexamined Patent Publication (Kokai) No. 6-94923 discloses a light diffusing layer formed by printing a foamable coating and forming fine cells.

All of the above means for improving the brightness utilize a light diffusing layer provided on the reverse side of the light guide plate by screen printing or the like, and attempts have been hardly made to improve the brightness by improving components constituting the back light device. In order to enhance the brightness, a polyester film with silver deposited thereon is, in some cases, used as the reflection sheet disposed so as to surround the fluorescent lamp. This type of reflection sheet, however, involves problems including that a high frequency current leaks from the fluorescent lamp, resulting in increased current consumption. In recent years, a 75 $\mu$m-thick white polyester film or the like has become used as the reflection sheet. Further, a 188 $\mu$m-thick white foamed polyester film has been used on the reverse side of the light guide plate. The inventions described in the above patent documents too use the white foamed polyester film. The white foamed polyester film has a lower reflectance than the polyester film with silver deposited thereon, resulting in about 10% or more lowering of the brightness when the white foamed polyester film is built in the back light device.

Figure 2:
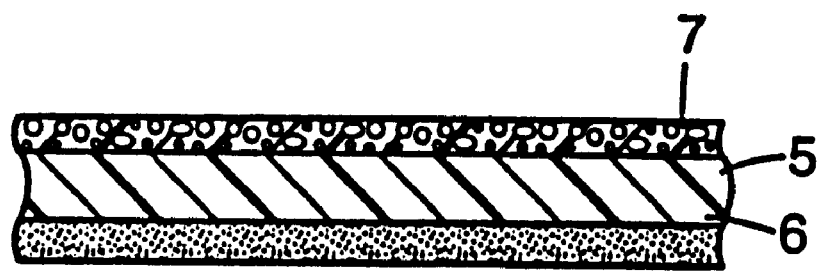

For this reason, as shown in FIG. 2, a reflection sheet comprising a 75 $\mu$m-thick white foamed polyester film 5 of the type described above, a white ink coating layer 6 provided on the reverse side of the polyester film, and a reflecting layer 7, formed of barium sulfate and an acrylic binder, provided on the reflecting surface side has been developed and used as an improved reflection sheet having an enhanced brightness (RW75C manufactured by Kimoto Co., Ltd.). For this reflection sheet, however, the improvement in brightness over the brightness for the conventional reflection sheet is unsatisfactory, i.e., only 3 to 5%.

In recent years, a reduction in thickness of liquid crystal panels has been desired in the art, leading to a reduction in diameter of the fluorescent lamp. The 75 $\mu$m-thick foamed polyester film which has been used up to now has a problem that, when the film is built in a back light device so as to surround the fluorescent lamp, due to excessively high stiffness, the work efficiency is so low that the productivity cannot be increased. Further, the foamed polyester film often poses a problem that it pushes out seams in the body of the liquid crystal panel, creating a gap through which light leaks. This results in lowered brightness. On the other hand, reducing the thickness of the white foamed polyester film for the purpose of lowering the stiffness causes a problem that the brightness lowers with a reduction in the film thickness.

PROBLEMS TO BE SOLVED BY THE INVENTION

For the above reason, in order to provide a screen having higher brightness, the development of a high-reflectance, low-stiffness reflection sheet has been desired in the art. An object of the present invention is to provide such a reflection sheet.

MEANS FOR SOLVING THE PROBLEMS

The present invention provides a reflection sheet comprising: a film support, such as polyester, and, applied on one side of the support, a reflective paint coat comprised of a mixture of a resin binder of a (meth)acrylate (the term "methacrylate" referring to acrylate or methacrylate; the same shall apply hereinafter) copolymer with a small particle balloon.

The particle diameter of the small balloon may be in the range of from about 0.05 to 10 $\mu$m. When the particle diameter is less than about 0.05 $\mu$m, it is difficult to prepare such a small balloon by emulsion polymerization. Even though the small balloon could be successfully prepared, the capability of scattering light is low, resulting in lowered brightness. When the particle diameter is more than about 10 $\mu$m, the capability of scattering light is lowered except for the case where a number of small empty spaces are present within the particle, i.e., where the empty space is not of a single spherical type. The inside empty diameter to particle diameter ratio is preferably in the range of from 0.2 to 0.9. When this ratio is less than 0.2, the proportion of the empty space within the particle balloon after the formation of a reflective coating layer (hereinafter often referred to as a "reflective layer") becomes very small, resulting in lowered brightness. On the other hand, when the ratio exceeds 0.90, the strength of the small particle balloon becomes so low that the particle balloon, when dried, cannot maintain its spherical shape and is crushed or collapsed, here again resulting in lowered brightness.

The small particle balloon may be formed of an organic material or an inorganic material. Regarding the small particle balloon formed of an inorganic material, there is a glass balloon. However, the small particle balloon is preferably formed of an organic material because it is difficult to provide particle balloons having the above particle diameter from the inorganic material. The organic small balloon may be prepared by emulsion polymerization or suspension polymerization of an acrylic monomer or a styrene monomer. Details relating to the production of the organic particle balloon are known and described, for example, in Japanese Unexamined Patent Publication (Kokai) No. 62-127336 and Japanese Examined Patent Publication (Kokoku) No. 3-9124.

The mixing ratio of the small particle balloon to the binder comprised of a (meth)acrylate copolymer also influences the brightness. The amount of the small particle balloon added is preferably 20 to 800 parts by weight, more preferably 100 to 300 parts by weight, based on 100 parts by weight of the binder. When it is less than 20 parts by weight, the brightness is lowered, while when it exceeds 800 parts by weight, the layer forming property of the reflective paint becomes so poor that the resultant reflective paint coat is very brittle.

Preferably, the binder used in the present invention is highly transparent and can maintain optical properties even after use for a long period of time, and a (meth)acrylate copolymer is suitable. Specific examples of the (meth)acrylate copolymer include (meth)acrylate/(meth)acrylic ester copolymer, (meth)acrylate/(meth)acrylic ester/styrene copolymer, and silicone-grafted (meth)acrylic ester copolymer. Among these resins, a resin having an average light transmittance of not less than 80% in the wavelength range of from 400 to 800 nm as measured in a 50 $\mu$m-thick film form at 23° C. is preferred. When the transmittance is less than 80%, the brightness becomes unfavorably small. The glass transition temperature (Tg) of the resin is preferably in the range of from −75 to 30° C. When the (meth)acrylate copolymer has a Tg below −75° C., the cohesive force is unsatisfactory. Consequently, the surface of the reflective layer becomes tacky, causing the reflective layer likely to be soiled. On the other hand, when the Tg exceeds 30° C., the adhesion of the reflective layer is lost, causing the reflective layer to be easily cracked or delaminated when the reflective sheet is curved.

The influence of the transmittance of the binder on the brightness is greater than the influence of the refractive index of the binder on the brightness, and the transmittance after aging is particularly important. When the binder is such that the transmittance is lowered after hot aging although high brightness is initially attained, the brightness is unfavorably lowered after use for a long period of time. Regarding properties of the binder other than the brightness, the layer forming property and the adhesion to the substrate are also important. When these properties are unsatisfactory, there is a possibility that a serious problem of delamination of the layer after use for a long period of time occurs. The results of evaluation of the binder are given in Table 1. The data shown in Table 1 are single point data.

TABLE 1

| Binder Trade name | Manufacturer | Kind | Refractive Index | Transmittance (%) Initial | Transmittance (%) After hot Aging |
|---|---|---|---|---|---|
| E-1054K | Soken Chemical Engineering Co. Ltd. | Acrylic | 1.470 | 94.6 | 91.5 |
| AN-49B | Soken Chemical Engineering Co., Ltd. | Acrylic | 1.468 | 95.6 | 93.4 |
| E-2150 | Soken Chemical Engineering Co., Ltd. | Acrylic | 1.472 | 93.6 | 89.0 |
| SX-8307A04 | Japan Synthetic Rubber Co., Ltd. | Acrylic/silicone | 1.476 | 100.0 | 96.2 |
| S-6211 | Toho Chemical Industry Co., Ltd. | Polyethylene | 1.503 | 97.5 | 50.0 |
| RW75C | Kimoto Co., Ltd. | | | | |

| Binder Trade Name | Brightness (%) Initial | Brightness (%) After hot aging | Adhesion of reflective layer |
|---|---|---|---|
| E-1054K | 106.7 | 98.0 | Good |
| AN-49B | 106.8 | 102.0 | Good |
| E-2150 | 104.3 | 98.8 | Good |
| SX-8307A04 | 102.0 | 100.0 | Delaminated after aging |
| S-6211 | 103.5 | 79.2 | Delaminated after aging |
| RW75C* | 100.0 | — | Good |

Note
Refractive index: It was measured
Transmittance: It was measured using U-400 type autographic spectrophotometer (manufactured by Hitachi, Ltd.). 50 $\mu$m thick films were prepared from the Note
Refractive index: It was measured with an Abbe refractometer.

Transmittance: It was measured using U-4000 type autographic spectrophotometer (manufactured by Hitachi, Ltd.). 50 $\mu$m-thick films were prepared from the above binders, and the transmittance was measured at a wavelength of 400 nm. In the wavelength range of from 400 to 800 nm, the transmittance is minimum at 400 nm for all the binder films.

Hot aging conditions: 100° C., 180 hr

Brightness: Reflection sheets composed of reflective layer, support layer and white ink layer were prepared in the same manner as in Example 14 below, except that the above binders and a small particle balloon (MH5055; manufactured by Nippon Zeon Co., Ltd.) were mixed together in a ratio of 100:200 (weight ratio). The reflection sheets were then used to measure the brightness. The brightness was expressed in terms of the value (%) of the brightness relative to that of RW75C (initial) manufactured by Kimoto Co., Ltd. The brightness of a hot-aged sample of RW75C was not measured.

Adhesion of reflective layer: For a reflection sheet made the same as the sheet for which the brightness was measured, the adhesion of reflective layer was observed.

*: Reflection sheet but not binder.

In the above test, the reflection sheet prepared using SX-8307A04 gave rise to delamination after hot aging. This problem can be overcome by primer treatment or the like.

The reflection sheet can be produced by a process comprising steps of applying a support with a flowable reflective paint, comprising a mixture of a water dispersion of a small balloon with an aqueous acrylic binder; and drying the resultant coating. Said applying of a support with a flowable reflective paint includes coating and spraying. Temperatures at the time of the drying are preferably from 90° C. or above to below the melting or softening point of the support. The reflective paint can be prepared by dispersing a commercially available small particle balloon in a powder form in a solvent and incorporating a binder in the dispersion. Mixing a water dispersion with an aqueous acrylic binder is preferred from the viewpoint of productivity because a reflective paint can be easily prepared at low cost. The thickness of the reflective paint after drying is preferably in the range of from 10 to 100 µm. When it is less than 10 µm, the brightness is low. On the other hand, when it exceeds 100 µm, problems associated with coating occur such as cracking of the surface of the resultant paint coat and lowered coating speed. When an aqueous reflective paint is used, the drying temperature should be 100° C. or above and, at the same time, dimensional stability should be ensured. For this reason, in this case, the use of a polyester film or a foamed white polyester film as the support is preferred.

Examples of films usable as the substrate include oriented polypropylene, polyester, nylon, polycarbonate, polysulfone, polyethersulfone, polyetheretherketone, polyphenyl sulfide, polyallylate, polyethylene naphthalate, polyester ether, and polyvinyl chloride films, an acrylic film, and a polymethylterpene resin film. As described above, the thickness of these films is preferably less than 75 µm. When the film thickness is not less than 75 µm, the workability of the film for its incorporation in a back light device so as to surround a fluorescent lamp is so low that the productivity cannot be increased. Further, in this case, an additional problem often occurs such that the reflection sheet surrounding the fluorescent lamp in a back light device becomes incomplete in the surrounding, and light leaks, resulting in lowered brightness. On the other hand, in the case of an excessively thin film, the resilience of the film is so low that the reflection sheet is cockled when the reflection sheet is built in the back light device, making it impossible to dispose the reflection sheet in an exact arc form when built in the back light device so as to surround the fluorescent lamp. This results in lowered brightness. For this reason, the thickness of the polyester film is preferably in the range of from 25 to 50 µm. The work efficiency in the incorporation of reflection sheets with varied polyester film thickness is given in Table 2.

TABLE 2

| Film Thickness (µm) | Workability of film for incorporation in a back light device | State of reflection sheet after incorporation | Light leakage |
| --- | --- | --- | --- |
| 12 | Good | Wrinkled | No leakage |
| 25 | Good | Not wrinkled | No leakage |
| 38 | Good | Not wrinkled | No leakage |
| 50 | Difficult to incorporate due to high resilience | Not wrinkled | No leakage |
| 75 | Difficult to incorporate due to high resilience | Large curvature of arc | Some leakage |

A white paint, containing titanium oxide, having high opacifying power may be coated on the reflection sheet remote from the reflective layer or between the support and the reflective layer. The provision of such a white opacifying layer prevents the transmission of light, contributing to an improvement in brightness. In FIG. 1, a cross-sectional view of an embodiment of the present invention is shown. In this figure, 1 is a support layer, 2 is a reflective paint coat layer and 3 is a white ink layer.

The brightness can be improved also by incorporating an inorganic white pigment or a relatively large diameter glass balloon (at present it is technically difficult to make a glass balloon having a particle diameter less than 10 µm) as a third component into the reflective paint. Examples of the inorganic white pigment include titanium oxide, zinc sulfide, barium sulfate, aluminum silicate, and acrylic beads containing titanium oxide. The incorporation of titanium oxide, zinc oxide or the like among the above inorganic white pigments into the reflective paint can provide high brightness even when no opacifying layer is formed.

It is also possible to further coat, on the reflective layer of the reflection sheet, a reflective paint comprising a (meth) acrylate copolymer and an inorganic white pigment incorporated therein. In such a case, the surface strength can be increased without detriment to the brightness by coating the reflective layer with a reflective paint prepared by mixing 100 parts by weight of an acrylic resin having a good layer forming property and a high transmittance with about 100 parts by weight of an inorganic white pigment to form a 1 to 10 µm-thick layer (called a "top coat").

Since the reflection sheet is arranged to surround the fluorescent lamp, the sheet deteriorates in the influence of an infrared light and heat emitted from the fluorescent lamp, which, according to the use conditions of the sheet, lowers the optical characteristics, especially, brightness. In order to prevent these troubles, it is preferable to add 0.01 to 5 wt % of an antioxidant, ultraviolet light absorber or ultraviolet light stabilizer to the reflection sheet. Examples of the antioxidant include 2,4-bis[(octylthio)methyl]-o-cresol, isooctyl-3-(3,5-di-t-butyl-4-hydroxyphenyl)propionate, etc. Examples of the ultraviolet light absorber include methyl-3-[3-t-butyl-5-(2H-benzotriazole-2-il)-4-hydroxyphenyl] propionate-polyethylene glycol, hydroxydiphenyl benzotriazol derivative, etc. Examples of the ultraviolet light stabilizer is bis(2,2,6,6-tetramethyl-4-piperidil)sebacate, bis(2,2,6,6-pentamethyl-4-piperidil)sebacate, etc. These can be used singly or as a mixture. It is also effective to increase the weather resistance of the reflection sheet to add an ultraviolet light absorber or an inorganic filler having an ultraviolet light sheltering effect. Since a main cause of the deterioration by the ultraviolet light is the small particle balloon including styrene, it is also effective to increase the weather resistance of the reflection sheet to substitute an inorganic filler for the small particle balloon.

EXAMPLES

Details of small particle balloons used in reflective paints in the following examples and comparative examples are as follows according to reports of each manufacturer.

TABLE 3

| Identification symbol | Manufacturer | Material | Particle dia. (µm) | Inside empty dia./ particle dia. |
| --- | --- | --- | --- | --- |
| OP-62 | Rohm & Hass Japan k.k. | Styrene/acrylic | 0.45 | 0.69 |
| OP-84J | Rohm & Hass Japan k.k | Styrene/acrylic | 0.55 | 0.64 |

TABLE 3-continued

| Identi-fication symbol | Manufacturer | Material | Particle dia. ($\mu$m) | Inside empty dia./ particle dia. |
|---|---|---|---|---|
| HP-91 | Rohm & Hass Japan k.k. | Styrene/acrylic | 1.00 | 0.80 |
| AE-863A | Synthetic Rubber, Co., Ltd. | Styrene/acrylic | 0.35 | 0.80 |
| MH5055 | Nippon Zeon Co., Ltd. | Styrene/acrylic | 0.50 | 0.82 |

The binder used in the reflective paint was SKDYNE (trade name) AN-49B, which is an acrylic ester copolymer, manufactured by Soken Chemical Engineering Co., Ltd. It had a Tg of −48° C. and an average light transmittance of 97% in the wavelength range of from 400 to 800 nm.

Details of fillers used in the reflective paint or top coat are as follows.

TABLE 4

| Manufacturer | Trademark or identification symbol | Material | Abbreviation in Table 5 |
|---|---|---|---|
| Dainichiseika Color & Chemicals Manufacturing Co., Ltd. | Ep 677White | $TiO_2$ | 677White |
| SACHTLEBEN CHEMIE GMBH | Sachbtolith ™ HD-S | ZnS | HD-s |
| Toshiba-Ballotini Co., Ltd. | Toshiba Glass bubble HSC110 | Glass bubble | HSC110 |
| Degussa Japan Co. Ltd. | Aluminum Silicate P-820 | Aluminum silicate | P-820 |
| Merc Japan | Iriodin ™ 103W2 | Pearl pigment | 103W2 |

Examples 1 to 7

A white ink (a mixture of an acrylic/urethane binder with 50% by weight of Lamic™ F-22OHC White manufactured by Dainichiseika Color & Chemicals Manufacturing Co., Ltd. (titanium oxide)) was coated on one surface of a 36 $\mu$m-thick white foamed polyester film (MELINEX™ 337, manufactured by ICI Co., Ltd.) (Examples 1 and 2 and 4 to 7) or a 36 $\mu$m-thick unfoamed transparent polyester film (Example 3), which has been subjected to a treatment for facilitating bonding, to a thickness on a dry basis of 20 $\mu$m, and the resultant coating was then dried, thereby preparing a white sheet. A reflective paint prepared according to a formulation specified in Table 3 was coated on the white ink layer of the white layer to a thickness on a dry basis of 50 $\mu$m, and the resultant coating was then dried to prepare a reflection sheet. The reflection sheet thus obtained was slit into a strip having a width of 20 mm and a length of 219 mm. The strip was fixed with a pressure sensitive adhesive double coated tape having a width of 2 mm (#531, manufactured by Nitto Denko Corp.) to a light guide plate (width 164 mm, length 219 mm, thickness on fluorescent tube side 3.2 mm, thickness on the opposite side 1.2 mm) so as to surround a fluorescent tube, having a diameter of 2.6 mm, disposed on one end of the light guide plate and then built in a back light device, and the brightness was measured with a luminance meter LS-110 manufactured by Minolta K.K. Similarly, the brightness was measured for RW75C manufactured by Kimoto Co., Ltd. (Comparative Example 1). The value (%) of the brightness of the sample relative to the brightness for RW75C is given in Table 5.

Examples 8 to 19

Each of reflective paints listed in Table 5 was coated on the surface of the same white sheet as used in Example 1 (Examples 8 and 10 to 19) or the same transparent sheet as used in Example 3 (Example 9) remote from the white ink layer to a thickness on a dry basis of 50 $\mu$m, and the resultant coating was then dried, thereby preparing reflection sheets. For the reflection sheets thus obtained, the brightness was measured in the same manner as in Example 1. The relative brightness values are given in Table 5.

Examples 20 to 22

Each of reflective paints (binder: a silicone-grafted type acrylic ester copolymer (trade name: Silicone-Acrylic Emulsion SX-8307 (A)04), Tg=5° C., average light transmittance in the wavelength range of from 400 to 800 nm=100%) containing fillers listed in Table 5 was coated on the reflective coating layer of the reflection sheet prepared in Example 8 to a thickness on a dry basis of 5 $\mu$m, and the resultant coating was then dried to form a layer (called a "top coat"), thereby preparing reflection sheets. For the reflection sheets thus obtained, the brightness was measured in the same manner as in Example 1. The relative brightness values are given in Table 5.

Comparative Example 1

For a reflection sheet RW75C manufactured by Kimoto Co., Ltd., the brightness was measured in the same manner as in Example 1. The results are given in Table 5. This reflection sheet is one which is formed of a white foamed polyester film having a thickness of 75 $\mu$m the backside of which is coated with an ink layer formed by mixing $TiO_2$ and an urethane binder having a thickness of 30 $\mu$m and the reflecting surface side of which is coated with a reflecting layer formed of barium sulfate and an acrylic binder with a thickness of $\mu$m.

Comparative Example 2

A white ink (Lamic™ F-22OHC White, manufactured by Dainichiseika Color & Chemicals Manufacturing Co., Ltd.) (titanium oxide) was coated on the surface of a 36 $\mu$m-thick white polyester film (MELINEX™ 337, manufactured by ICI Co., Ltd.), which has been subjected to a treatment for facilitating bonding, to a thickness on a dry basis of 20 $\mu$m, and the resultant coating was then dried, thereby preparing a white sheet. The brightness was measured in the same manner as in Example 1 in the case where the white sheet was disposed so that the white ink face of the white sheet faced the fluorescent tube. The results are given in Table 5.

Comparative Examples 3 and 4

Each of reflective paints listed in Table 5 was coated on the white sheet, prepared in Comparative Example 2, remote from the white ink layer to a thickness on a dry basis of 50 $\mu$m, and the resultant coating was then dried, thereby preparing a reflection sheet. For this reflection sheet, the brightness was measured in the same manner as in Example 1. The results are given in Table 5.

TABLE 5

Formulation (or construction) or reflective layer

| Ex. Comp. Ex. | Reflection sheet Construction | Small particle balloon | Binder | Filter | Mixing ratio (weight ratio) Balloon:binder:filler: | Brightness (%) |
|---|---|---|---|---|---|---|
| Ex. 1 | RWB | OP-62 | AN-49B | — | 200:100 | 113 |
| Ex. 2 | RWB | OP-62 | AN-49B | — | 400:100 | 121 |
| Ex. 3 | RWB | OP-62 | AN-49B | — | 200:100 | 115 |
| Ex. 4 | RWB | OP-62 | AN-49B | 677White | 150:100:50 | 115 |
| Ex. 5 | RWB | OP-62 | AN-49B | HD-S | 160:100:40 | 117 |
| Ex. 6 | RWB | OP-62 | AN-49B | HSC110 | 160:100:40 | 116 |
| Ex. 7 | RWB | OP-62 | AN-49B | P-820 | 160:100:40 | 115 |
| Ex. 8 | RBW | OP-62 | AN-49B | — | 200:100 | 121 |
| Ex. 9 | RBW | OP-62 | AN-49B | — | 200:100 | 118 |
| Ex. 10 | RB | OP-62 | AN-49B | — | 200:100 | 117 |
| Ex. 11 | RBW | OP-84J | AN-49B | — | 200:100 | 117 |
| Ex. 12 | RBW | HP-91 | AN-49B | — | 200:100 | 120 |
| Ex. 13 | RBW | AE-863A | AN-49B | — | 200:100 | 117 |
| Ex. 14 | RBW | MH5055 | AN-49B | — | 200:100 | 117 |
| Ex. 15 | RBW | OP-62 | AN-49B | 677White | 150:100:50 | 118 |
| Ex. 16 | RB | OP-62 | AN-49B | 677White | 150:100:50 | 115 |
| Ex. 17 | RBW | OP-62 | AN-49B | HD-S | 160:100:40 | 121 |
| Ex. 18 | RBW | OP-62 | AN-49B | HSC110 | 160:100:40 | 120 |
| Ex. 19 | RBW | OP-62 | AN-49B | P-820 | 160:100:40 | 117 |
| Ex. 20 | TRBW[1] | OP-62 | AN-49B | — | 200:100 | 117 |
| Ex. 21 | TRBW[2] | OP-62 | AN-49B | — | 200:100 | 117 |
| Ex. 22 | TRBW[3] | OP-62 | AN-49B | — | 200:100 | 115 |
| Comp. Ex. 1 | RBW | RW75C from Kimoto Co., Ltd. | | — | | 100 |
| Comp. Ex. 2 | WB | MELINEX 337 36 μm WhitePET | | — | | 107 |
| Comp. Ex. 3 | RBW | | AN-49B | 103W2 | 0:100:200 | 90 |
| Comp. Ex. 4 | RBW | | AN-49B | HSC110 | 0:100:200 | 103 |

Note
R: reflective layer
W: white ink layer
B: support layer
T: top coat layer
TRBW[1]: BaSO4 was used as filler for top coat.
TRBW[2]: Toshiba Glass Bubble HSC-110 (trade name) manufactured by Toshiba-Ballotini Co., Ltd. was used as filler for top coat.
TRBW[3]: Aluminum Silicate P-820 manufactured by Degussa Japan Co., Ltd. was used as filler for top coat.

Example 23

A reflection sheet was obtained by a method similar to Example 8, except that, as the ultraviolet light stabilizer, 2.0 parts by weight of TINUVIN (registered trademark) 765 manufactured by Nihon Ciba Geigy K.K. When it was arranged into a back light unit and measured in the brightness, it exhibited 15% higher brightness than RW75C manufactured by Kimoto Co., Ltd. Further, the reflection sheet obtained as above and RW75C manufactured by Kimoto Co., Ltd. were each arranged into back light unit and leaving in an oven at a temperature of 80° C. for 230 hours. Then only reflection sheets were removed and arranged into new back light units respectively. The brightness of the sheets were measured. The reflective sheet obtained as above lowered the brightness by 3%. However, it exhibited 12% higher brightness value than RW75C manufactured by Kimoto Co., Ltd.

EFFECT OF THE INVENTION

The present invention can provide a reflection sheet which, as compared with a conventional 75 μm-thick white foamed polyester film used for surrounding a straight tube type fluorescent lamp in an edge type back light device among back light devices of liquid crystal display panels, can realize higher brightness of the back light device using a thinner, lower stiffness film.

What is claimed is:

1. A reflection sheet comprising: a film support and, applied on a surface of the support, a reflective paint coat comprising a mixture of a resin binder of a (meth)acrylate copolymer with a small particle balloon having a particle diameter of 0.05 to 10 μm and an inside empty diameter to particle diameter ratio of 0.2 to 0.9.

2. The reflection sheet according to claim 1, wherein the reflective paint coat has a thickness of 10 to 100 μm.

3. The reflection sheet according to claim 1, wherein the amount of the small particle balloon incorporated is 20 to 800 parts by weight based on 100 parts by weight on a solid basis of the resin binder.

4. The reflection sheet according to claim 1, wherein the (meth)acrylate copolymer has an average light transmittance of not less than 80% in the wavelength range of from 400 to 800 nm and a glass transition temperature of −75 to 30° C.

5. The reflection sheet according to claim 1, wherein a white paint coat containing titanium oxide is applied onto the surface of the support remote from the reflective paint coat or between the reflective paint coat and the support.

6. The reflection sheet according to claim 1, wherein the reflective paint coat contains an inorganic white pigment.

7. The reflection sheet according to claim 1, wherein an inorganic white pigment is coated on the surface of the support remote from the reflective paint coat.

* * * * *